Figure 1:
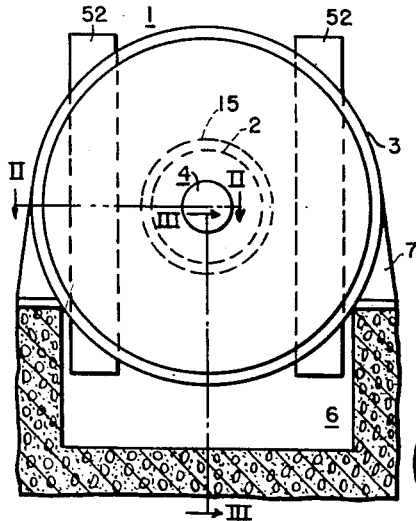

Oct. 30, 1951          G. L. MOSES          2,573,670
INSULATION OF GENERATOR WINDINGS
Filed Aug. 12, 1949

INVENTOR
Graham L. Moses.
BY O. B. Buchanan
ATTORNEY

UNITED STATES PATENT OFFICE 2,573,670

INSULATION OF GENERATOR WINDINGS

Graham L. Moses, Pittsburgh, Pa., assignor to Westinghouse Electric Corporation, East Pittsburgh, Pa., a corporation of Pennsylvania Application August 12, 1949, Serial No. 110,010

20 Claims. (Cl. 171—252)

My invention relates to the insulation of generator windings, and it has particular relation to the insulation of the primary windings of large high-voltage turbine generators, of the class having a voltage-rating of at least 10,000 volts, with either two or four poles at 60 cycles, with a rotor-diameter sufficient to make the machine have a peripheral rotary velocity of at least 28,000 feet per minute.

The cooling of large generator-windings presents peculiar problems, especially where they are operated at high voltages. Conventional large generators have been gas-cooled, generally employing hydrogen as the cooling-medium. Unconventional machines have been known, at least on paper, in which a cylindrical insulating partition has been attached to the airgap-bore of the stator core, so as to provide a separate chamber for the stator member, so that the stator may be liquid-cooled, or sometimes cooled by a vaporizable liquid which takes advantage of the latent vaporization. The cylindrical airgap-partition had to be used, because the friction-losses of rotating a rotor-member in a liquid would be prohibitive, even in small machines operating at relatively low speeds, and would be very much out of the question in large high-speed turbine generators, where the present-day use of hydrogen has brought down the windage-losses to very considerably less than the windage-losses in air. Windage-losses are an important item in the consideration of the user of large high-speed machines, because they represent day-in and day-out losses which are chargeable against the cost of operating the machine.

In a turbine generator, the stator member is invariably the primary winding, which is the member having the high-voltage winding. If a conventional stator member of a turbine generator were simply immersed in oil, with some means for cooling the oil, a certain amount of improvement would be realized in the cooling, as compared to gaseous cooling, because the circulation of small quantities of oil over the end-turns of the winding, and through the core, would effectively remove heat from the coil-insulation-surfaces of the winding, and from the core-surfaces. There is a two-fold reason for this improvement: (1) the specific heat of liquids (such as oil) is high and (2) the temperature gradient at the boundary between a solid and a fluid is less for a liquid than for a gas. However, this oil-immersion cooling of a conventional stator member of a turbine generator would leave the basic wall of electric insulation, with which the winding-coils must be covered, as a thermal insulation-barrier to the flow of copper-losses to the cooling-medium. Since the thermal gradient through this electrical insulation is relatively great, the oil-immersion of a conventional stator-member of a turbine generator would merely lower the core-temperature, which would not, in general, produce a sufficient increase in the rating to justify the extra cost and complication, or the fire-hazard due to the presence of large quantities of oil near the superheated surfaces which are present in the turbine which drives the generator.

The basic electric insulation-wall constitutes quite a formidable barrier against the flow of the copper heat-losses from the winding-conductor to the cooling-medium, because of the rigid requirements in respect to electrical insulation-strength, particularly where the voltage-rating is high, as is the case in the large turbine generators to which my invention is particularly applicable, and in which the machine-ratings are constantly being increased, both as to the power-rating (size of machine) and as to the voltage-rating (thickness of insulation). It has been necessary to apply the major insulation to the high-voltage winding conductors by tedious hand-labor. The thickness of the insulation has been very large, particularly in the coil-sides which lie within the stator winding-receiving slots, which constitutes the major portion of the coil-length (because turbine generators are characteristically long in an axial direction). Such conventionally insulated machines have presented a serious thermal problem, because there have been many thermal junctions, between dissimilar materials in series, through which the heat had to flow, with the result of a fairly large thermal gradient at each boundary between dissimilar materials, to say nothing of the temperature-gradient through each of the insulating-materials. For example, one heat-flow path may be from the copper to asphalt-bonded mica, and thence to a varnish-filled glass tape, and from there to the punchings of the stator-core, and ultimately into the cooling-gas in the vent-ducts of the stator-core.

To put some axially extending cooling-ducts within the winding-receiving slots, as by making the slots larger than necessary to receive the winding-conductors and their insulation, would only partially eliminate one of these boundary temperature-gradients, namely that between the varnish-filled glass tape and the punchings, in the illustration just given; and the thermal advantage which could thereby be obtained would be so slight that this form of slot-ventilation has not been favored, in this country, for the primary windings of high-voltage turbine generators.

While liquid-coolants, such as transformer-oil, have excellent dielectric strength, it has been found that such liquid insulation alone, or liquid-immersed insulating creepage-surfaces (without a thick, continuous insulating-covering over the winding-conductors), are not adequate, at the spacings which are necessary in the stator-slots, for economical machine-design of these high-voltage turbine generators. Therefore, solid dielectric barriers are essential within the stator-slots. The overlapping creepage-surfaces which are provided by such solid dielectric barriers may be much shorter, when immersed in an insulating liquid, than would be permissible when immersed in a gas (such as hydrogen) at approximately atmospheric pressure, as has heretofore been the case.

Approximately atmospheric pressures have heretofore been used for the hydrogen in hydrogen-cooled turbine generators because, while increased hydrogen-pressures would increase the rate at which heat was withdrawn from the stator-punchings, (that is, from the last thermal boundary which was encountered in the removal of heat from the copper to the hydrogen), the presence of all of these other thermal boundaries, in series with the boundary between the punchings and the hydrogen, made up the major portion of the thermal barrier against the removal of heat from the copper, so that the advantage attendant upon the use of high hydrogen-pressures has been really too slight to warrant the complication that would be attendant upon increasing the hydrogen-pressure materially above the surrounding atmospheric pressure, (although hydrogen-pressures of 30 pounds per square inch have been known). The advantages of these, or still higher, hydrogen-pressures have been insufficient to justify the resulting increase in the windage-losses which are so objectionable to the user of the machine.

However, if solid discontinuous dielectric barriers are present within the stator-slots of turbine generators, and if these barriers are immersed in a gaseous medium, the dielectric breakdown-strength of the overlapping creepage-surfaces along the barriers can be considerably increased by an increase in the gaseous pressure. By going to gaseous pressures of four and five and six atmospheres above the surrounding atmosphere, this creepage-surface dielectric-strength can be increased to the point where it is comparable to that which is obtained with oil-immersion, and discontinuous or broken slot-insulation becomes feasible in high-voltage windings, when immersed in either a high-pressure gas, or an insulating liquid such as oil.

An object of my present invention is to provide a cooling-system for the primary windings of large high-voltage turbine generators, using a novel form of slot-insulation, in combination with axially extending cooling-ducts lying within the conductor-receiving slots of the stator-core, together with a recirculating means for causing said cooling-ducts to be traversed either by an insulating liquid or by a gas at pressures which are materially higher than atmospheric, whereby the dimensions of the cooling-ducts and the dimensions of the insulating barriers necessary for producing the requisite creepage-surface dielectric-strength may be sufficiently small so that the slot-dimensions can be reasonably in line with the practice which has heretofore been conventional for these types of machines.

An object of my invention is to provide a cooling-system, by the combination of means which has just been described, whereby the axially extending cooling-ducts which are provided in the conductor-receiving stator-slots are bounded, on one side, by the primary-winding conductors, themselves, with no insulation over the conductors (other than the conventional strand-insulation of a single-conductor coil, or the normal turn-insulation of a multi-turn coil). In this way, the thermal path for the removal of the copper-losses, is substantially directly from the copper to the cooling fluid in these axially extending ducts within the respective conductor-receiving slots of the stator-core. In my new cooling-system, practically none of the heat due to the resistance-losses in the primary-winding copper flows into the magnetic core-laminations, because my new method places a dielectric barrier against the walls of the conductor-receiving slots, with the cooling-ducts inside of this barrier, so that little (if any) of the copper-loss is transmitted through said barrier. (The iron losses in the stator-core are dissipated by a separate duct-system which may be conventional, except that it need be designed to be adequate only to remove the iron-losses, instead of being required to remove both the copper-losses and the iron-losses of the machine.)

An object of my invention is to provide a large high-voltage turbine generator in which, by reason of the improved cooling-system which has just been outlined, the copper-losses may be removed at a rate which is twice as fast, or even greater than that, as compared with the rate at which copper-losses could be removed in practical designs which were previously known, thus resulting in a two-fold, or greater, increase in the current-rating, and hence the power-rating, of a given machine; and I accomplish these results with a slot-size which is comparable to the sizes of the conductor-receiving slots heretofore employed, and without any reduction in the insulation strength.

Figure 2:
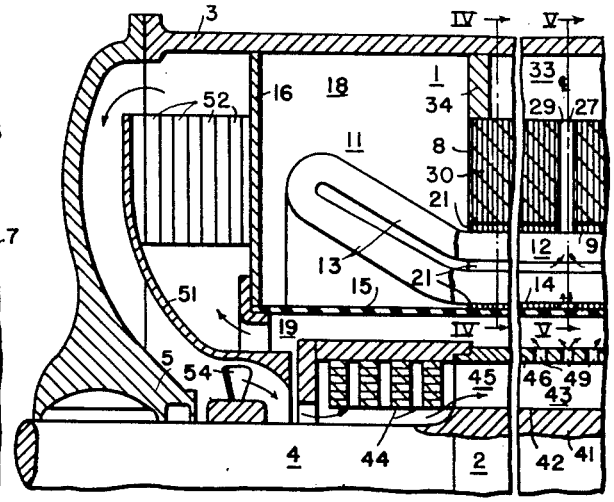
Figure 3:
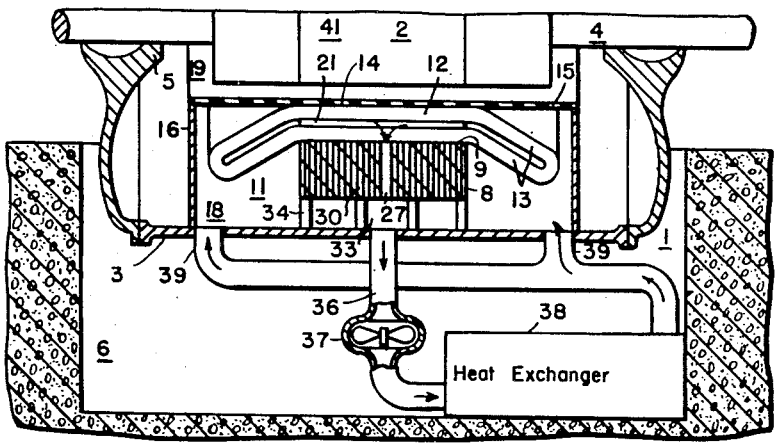
Figures 4, 5, 6:
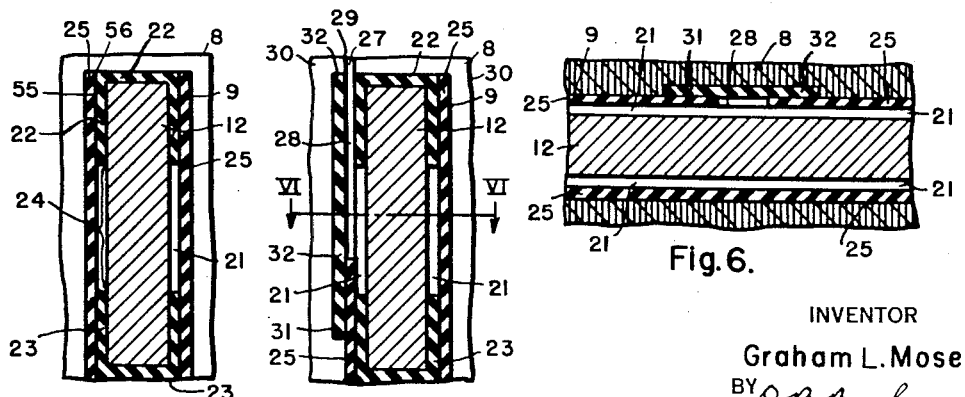

There are other objects and advantages, of a more or less incidental nature, some of which will be pointed out in the subsequent description. My invention consists in the combinations, systems, structures, parts and methods of design and operation which are hereinafter described and claimed, and illustrated in the accompanying drawing. In the drawing:

Figure 1 is a diagrammatic end-view of an illustrative form of a machine in which my invention is embodied, Fig. 2 is a somewhat diagrammatic fragmentary horizontal section, on a larger scale, on the plane indicated by the line II—II in Fig. 1, Fig. 3 is a reduced-scale and somewhat diagrammatic vertical section of the bottom half of the complete length of the machine, on the section-plane indicated by the line III—III in Fig. 1, Fig. 4 is a fragmentary longitudinal section, on a larger scale, through one of the conductor-receiving slots of the stator-core, showing the axially extending cooling-ducts therein, and the special slot-insulation which I have used for the purpose of providing these cooling-ducts within the slots, the section-plane being indicated, for example, at IV—IV in Fig. 2, Fig. 5 is a similar view at the place, near the center of the axial length of the stator-core, where one of the radial outlets for ventilating fluid is provided, as on the section-plane indicated at V—V in Fig. 2, and Fig. 6 is a fragmentary longitudinal sectional view on the plane indicated by the line VI—VI in Fig. 5.

In the drawing, I have illustrated my invention as being applied to a large high-speed polyphase turbine generator of the type which I have hereinabove described, comprising a stator member 1 and a rotor member 2. The stator member 1 is supported within an enclosing housing 3, and the rotor member 2 is carried by a shaft 4 which is illustrated as being journalled within the end-walls of the housing 3, and also provided with suitable fluid-tight means (or gland-seal means) at these journalled portions, as somewhat diagrammatically indicated at 5. The machine is supported, over a pit 6, on feet 7.

The stator member 1 comprises an annular stator-core 8 which is supported within the housing 3 and which has axially extending conductor-receiving slots 9 therein. The stator member 1 also includes the primary winding 11 of the machine, said winding having preformed coils having flat-sided winding-portions or coil-sides 12 which are disposed within said conductor-receiving slots 9, and end-turn portions 13 which are disposed outside of the stator-core 8. The stator-core 8 has an airgap-bore 14, within which is secured a stiff cylindrical insulating member or barrier 15, which extends through said airgap-bore 14 of said stator-core, and which extends axially beyond said stator-core at each end. At each end of the cylindrical barrier 15, I provide means, which are shown as including an annular partition-member 16, for making a fluid-tight connection between that end of the cylindrical insulating barrier 15 and some portion of the frame-member or housing 3, thereby dividing the space within the housing 3 into a fluid-tight outer-chamber 18 which surrounds said cylindrical insulating barrier 15 and which houses the stator-core 8 and the primary winding 11, and an inner fluid-tight chamber 19 which houses the rotor-member 2.

In accordance with my present invention, the outer chamber 18 is substantially filled with an insulating liquid such as transformer-oil, or else it is filled with a gas at several atmospheres pressure, as will be subsequently described, or else it is filled with a gas which contains a spray of a vaporizable liquid such as will be subsequently described. Also, in accordance with my invention, the stator winding-receiving slots 9 are slightly larger than the cross-section necessary to accommodate the total conductor-cross-section and the necessary slot-insulation of the coil-sides 12 lying within the respective slots, so as to provide axially extending cooling-ducts 21, extending through these slots, and the slot-insulation is specially designed so as to provide these cooling-ducts, as follows.

As shown in Figs. 4 and 5, I provide top and bottom preformed axially extending solid insulating-channels 22 and 23, respectively, for each of the coil-sides 12 lying within the respective stator-slots 9. These insulating channel members 22 and 23 are of considerable thickness, and they have a high dielectric strength (at least under the fluid-pressures which I use). High dielectric strength may be imparted to solid insulating members by suitable pressure of consolidation, as is known to be possible in the construction of separate preformed insulating-members. The top and bottom insulating channels 22 and 23 fit respectively over and under the respective coil-sides 12, and they cover only the top and bottom parts of said coil-sides, fixing the location of the coil-sides within the respective slots, and leaving an intermediate side-surface 24 (Fig. 4) uncovered on each side of each said coil-sides 12. I also provide flat insulating barriers 25, lying against the respective sides of the respective slots 9, in overlapping relation to the sides of the insulating channels 22 and 23, thus providing the previously mentioned cooling-ducts 21, which are bounded, on one side, by the uncovered intermediate side-surface 24 of the associated coil-side 12, and which are bounded, on the other side, by one of the side-barriers 25, and which are bounded, on their top and bottom ends or edges, by the side-wall thickness of the top and bottom channel-members 22 and 23, respectively. These cooling-ducts 21 are open at each end of the stator-core 8, so that the cooling fluid may be forced to enter said cooling-ducts 22 at each end of the core, as will be subsequently described.

Near the axial center of the stator-core 8, I provide one or more radial ducts 27 for the escape of the cooling fluid from the central portions of the cooling-ducts 21 to the outer periphery of the stator-core 8. As shown in Figs. 5 and 6, these radial ducts 27 may be provided by notches or radial cutout-portions 28, provided in first one side-barrier 25, and then the other, at different points along the cooling-ducts 21, so as to avoid unnecessary enlargements in the stator-slots 9 at any one point, as will be described in a moment. These radial notches 28 communicate with radial vents 29 (Fig. 5) which are provided in special stator-core laminations 30 at these particular points. The stator-slots 9 are preferably enlarged, as shown at 31 (Figs. 5 and 6), at the places where these radial notches 28 are provided, so as to provide room for extra insulating barriers 32 which may be placed against the sides of the enlargements 31, in overlapping relation to the notches 28 in the barriers 25, so as to provide suitable overlapping creepage-distances as will be subsequently described.

The radial vents 29 in the stator-core 8 carry the cooling fluid from the cooling-ducts 21 within the conductor-receiving slots 9, and discharge the same at the outer periphery of the stator-core 8. There is always an annular space 33 (Figs. 2 and 3) between the outer periphery of the stator-core 8 and the cylindrical portion of the frame-housing 3, because of the necessity for providing massive mounting-rings 34 which support the outer periphery of the stator-laminations 8, for supporting the weight of the stator-core and windings.

The radially discharged cooling-fluid is taken out of this space 33 between the outer periphery of the stator-core 8 and the cylindrical portion of the housing 3, by means of a suitable outlet-pipe 36 (Fig. 3), which preferably leads down into the pit 6 beneath the machine, and which is connected to a pump 37 which delivers the cooling-fluid to a cooler or heat-exchanger 38, from whence the fluid is delivered to inlet-pipes 39 leading to the respective ends of the outer chamber 18 for continuous recirculation.

The inner chamber 19, within which the rotor member 2 rotates, is preferably hydrogen-cooled, in order to reduce the windage-losses, as previously described, but contrary to previous practice, the hydrogen-filling within the inner chamber 19 is kept at a pressure of several atmospheres, or at a pressure of at least 50 pounds per square inch over the surrounding atmosphere.

The rotor member 2 comprises a rotor-core 41 which is mounted on the shaft 4. The rotor-core is provided with conductor-receiving slots 42 (Fig. 2), which receive the coil-sides 43 of the field-winding 44 of the turbine generator. The field-winding coil-sides 43 are preferably made of conductors of channel-form, as shown and described in a Baudry Patent 2,221,567, granted November 12, 1940, so that the channels of the coil-side conductors provide axially extending cooling-ducts 45 within the conductor-receiving slots 42 of the rotor-core. At one or more points near the center of the rotor-core 41, the slot-wedges 46 (Fig. 2) are perforated, and similar perforations are provided in the channel-shaped field-winding conductors, so as to provide one or more radial vents 49, through which the cooling fluid is radially discharged from the centers of the cooling-ducts 45 to the portion of the airgap between the outer periphery of the rotor-core 41 and the inner periphery of the cylindrical insulating member or barrier 15, from whence the cooling fluid (hydrogen under pressure) is returned to the respective ends of the rotor-member, where it is directed, by suitable baffles 51 (Fig. 2), to one or more vertically extending coolers or heat-exchangers 52, and thence directed, by said baffles 51, to the inlet side of a fan 54 which is carried by the shaft 4 at each end of the rotor-core 41, whereby a continuous recirculation of the hydrogen is maintained.

The rotor-cooling means is conventional, except for two important changes: the cylindrical airgap-barrier 15 has been added, and the hydrogen-pressure has been increased to several atmospheres, perhaps as high as six or seven atmospheres, instead of the previous practice of commonly using approximately atmospheric pressure for the hydrogen-cooling. Since the rotor-winding 44 is the field-winding of the machine, it is designed for a relatively low voltage, so that there are no particularly severe insulating-problems, and no corona-problem, so that the axially extending cooling-ducts 45 can be readily provided in the coil-sides which lie in the rotor-slots 42, and such a construction has already been adopted for the rotor-construction, as shown in the Baudry Patent 2,221,567, except that substantially atmospheric pressure was used for the hydrogen.

In the design shown in said Baudry patent, it was desirable to use the hydrogen at substantially atmospheric pressure, in order to take advantage of the extremely low density of hydrogen, as compared with air, as the windage-losses are dependent upon the gas-density. The use of hydrogen, instead of air, was introduced for the very purpose of minimizing these windage-losses, which were becoming very serious as the size of the machine increased, particularly in the two and four-pole designs of machines having very large rotor members. Consequently, it was essential, if possible, for the hydrogen to be at a reasonablly low pressure, in order to keep its density as low as possible. Since it was also vitally necessary to prevent infiltration of air, so as to avoid explosive mixtures of hydrogen and air, it was not feasible to maintain the hydrogen at a pressure less than the pressure of the surrounding atmosphere, so that it became universally customary to maintain the hydrogen-pressure at a value which is only relatively slightly higher than the pressure of the surrounding air, so as to minimize air-infiltration, while at the same time using the hydrogen at as low a density (pressure) as possible.

There was another reason for keeping the hydrogen, heretofore, at substantially atmospheric pressure. Heretofore, the airgap cylindrical barrier 15 was not used, so that the hydrogen filled the entire machine-housing 3, serving for the ventilating-means for both the stator and rotor members. In the stator-member, it was necessary to use solid, continuous or unbroken insulation-barriers between the stator coil-side conductors and the stator-slots within which they were located, and these insulating barriers interposed so much resistance to heat-flow that no substantial advantage could be gained by going to higher hydrogen-pressures in an effort to increase the rate of heat-removal. In previous designs, also, the thermal designs of both the stator and rotor members were about equally matched, approximately speaking, so that neither one constituted the "bottle neck" which determined, by itself, the rating of the entire machine. While an increase in the pressure of the hydrogen of these hydrogen-cooled machines would have increased the permissible rating of the rotor-member faster than it would have increased the permissible rating of the stator-member, because of the presence of the previously provided cooling-ducts 45 in the rotor-slots 42, as shown in the Baudry Patent 2,221,567, it was not necessary to particularly investigate the possible effects of increased hydrogen-pressures on the rotor-cooling, because the rotor-cooling was already adequate, in comparison with the available stator-cooling, and the increased hydrogen-pressure would not make enough improvement in the stator-cooling to be worth while, in the absence of corresponding axially extending cooling-ducts in the stator-slots which receive the coil-sides of the high-voltage primary winding.

At approximately atmospheric pressure, the dielectric breakdown-strength of gases is so low that the provision of adequate surface-creepage lengths for overlapping, discontinuous insulating barriers would be many times out of the question, with any size of stator-slot which could possibly be thought of as an acceptable stator-design, at these substantially atmospheric pressures of a gaseous insulating fluid. Not only that, but the temperature-gradient between a solid and a gas is so high, when the gas is at substantially atmospheric pressure, and the amount of calories which can be absorbed by a cubic centimeter of the gas is so low, at atmospheric pressure, that the size of cooling-duct necessary to carry away the resistance-losses from the copper, even at conventional or usual current-densities in the stator-copper, would be almost commensurate with the cross-section of the copper itself, so that the size of a stator-slot having cooling-ducts therein, for directly removing the heat of the stator-conductors, would be prohibitive, with any available gas at substantially atmospheric pressure.

With these considerations in mind, it will be seen, therefore, that my adoption of either a liquid-coolant for the stator member, or a gaseous coolant at several atmospheres pressure, has made possible, for the first time, the use of cooling-ducts of reasonable dimensions, in conductor-receiving slots of reasonable dimensions, for the direct cooling of the winding-conductors of high-voltage turbine-generator windings. By these means, I have been able to carry away the copper losses two or three times as fast as has heretofore been possible, which is another way of saying that the current-concentration in the primary winding conductors may be increased $\sqrt{2}$ or $\sqrt{3}$ times above previous standards, without exceeding the previously encountered temperature-limits, and thus the kilowatt rating of the machine is correspondingly increased, provided that the rating of the rotor-member can also be increased, as can be done by increasing the pressure of the hydrogen coolant in the rotor.

Among the coolants which are available for my new stator winding, may be mentioned transformer oil or other insulating liquid, or a gaseous filling at a pressure of at least 50 pounds per square inch over the surrounding atmosphere, for example, hydrogen at several atmospheres pressure, air or other high-density gases such as sulfa hexafluoride at several atmospheres pressure, or a high-pressure gas containing a mist of fluorocarbons, or other chemically inert liquid-compound which vaporizes at the operating-temperatures prevailing within the stator-cooling-ducts, the various compounds of fluorine and carbon being quite suitable, for this purpose. All of these fluid coolants for the stator member have a dielectric breakdown-strength of at least 200 volts per mil, which is sufficiently high to provide the necessary surface-insulation creepage-strength so that the creepage-distances do not need to be unduly long, thereby making it possible to use the stator-slot cooling-ducts 22 which I have provided, thus, in turn, making it possible, for the first time, to directly cool the conductors of the high-voltage primary winding of a turbine generator, so that some important thermal advantage is obtained by increasing the pressure of a gaseous coolant, or by changing from a gaseous to a liquid coolant.

My new stator-insulation design involves prefabricated "built-in" slot-insulation members, in contrast with the conventional high-voltage coil-insulation which involved so much tedious hand-labor, because the same insulation was applied to all parts of the coil, including the very complicated coil-shapes which are involved in the stator end-turns 13. By the use of simple preformed insulating-members 22, 23 and 25 in the conductor-receiving stator-slots 9, I have been able to apply the principles of mass-production to the methods of fabrication, using ordinary machinery, and making possible the development of a high dielectric strength in these parts, by suitable compression or consolidation.

Certain new standards are necessary, in designing my new insulation. For example, in an oil-immersed generator-winding for a maximum operating-voltage of 15 kilovolts, it is desirable that the slot-insulation members 22, 23 and 25 each have a thickness of 100 mils, with an average hold (sustained) dielectric strength not less than 45 kilovolts, with a root-mean-square deviation ($\sigma$) of 5 kilovolts or less. It is desirable that the creepage-distance of overlapped barriers shall have a minimum length of at least 1", and that the striking-distance between metal parts, directly through oil, should have a minimum length of at least 1½". These limits are suitably changed for voltage-ratings other than 15 kilovolts. Similar standards, with only slight variations, will be used for high-pressure gas-immersed generator-windings in accordance with my invention. The slot-insulation 22, 23 and 25 may be made of mica plate, pressed board, and in general, various forms of insulating laminated material including any one of several base-materials such as paper, cotton cloth, fibre-glass cloth, and the like, with a suitable bonding-resin which may be any one of a number of previously well-known resins or some newer resin of the types including phenolic, urea, melamine, silicone, or styrene copolymer.

There is a particular advantage in using high-pressure hydrogen as the coolant for the stator-windings 11. Not only does such procedure dispense with the necessity for using the cylindrical airgap-barrier 15 for separating the stator-space 18 from the rotor-space 19, but I have discovered evidence which indicates that hydrogen probably has an unexpectedly high breakdown-voltage in a restricted gap in which the electrostatic field is badly distorted by the proximity of insulation walls. I am referring, not only to the pores in porous insulation, which might be used, but also to the creepage-distance which separates the bare conductor-surface 24 (Fig. 4) from the iron core 8 of the stator. This creepage-distance includes a long, very narrow gap 55 between the insulating barriers 22 and 25, for example, said gap terminating on the iron core 8 at 56 in Fig. 4. The literature of the art indicates that the breakdown-voltage of nitrogen (for example), in a uniform field, is 80% higher (and therefore better) than hydrogen, at subatmospheric pressures and also at pressures which are a little higher than atmospheric; and tests have shown that this advantage still holds, at still higher pressures. For instance, at 5 atmospheres pressure, the nitrogen breakdown-values are 85% to 100% higher than for hydrogen at the same pressure, in a uniform field. However, for some unforeseen and not altogether understood reason, when the gap-field is badly distorted, as in a gap which is confined between closely spaced insulating surfaces, the hydrogen breakdown-voltage is raised, as compared to the breakdown-voltage of a uniform-field gap, whereas the nitrogen breakdown-voltage (except at low gap-spacings or low gas-pressures) is lowered under the same restricted-gap conditions. Thus, the insulation-level of my novel channel-barrier insulation-structure is apparently better, when high-pressure hydrogen is used, than when high-pressure nitrogen (or other gas) is used, at creepage-distances of the order of one inch, and gas-pressures of the order of 3 to 7 atmospheres.

By the use of my channel-barrier insulation-structure and high-pressure hydrogen, I have obtained a breakdown insulation-strength which is sufficiently high to permit overvoltage-testing of the primary (stator) windings of the completed machine, with a considerable margin of safety. If, after the machine has been put into operation, the gaseous pressure were suddenly reduced to atmospheric, as a result of some accident, the insulation-strength would still be adequate for the operating-voltage for a short time, until either the power could be removed or the gaseous pressure restored. The addition of a small amount of a heavy-molecule fluorocarbon vapor, such as perfluoromethylcyclohexane, in such an emergency (loss of gaseous pressure), would approximately double the flashover-strength for emergency-operation, but it would increase the windage-losses (if introduced in the rotor-space 19) by as much as one hundred times, during such emergency-operation.

Certain broad features of turbine-generator cooling, using high-pressure hydrogen for the rotor and either high-pressure hydrogen or some other highly effective coolant for the stator, as described herein, constitute the subject-matter of claims in a companion application of R. A. Baudry, Serial No. 109,999, filed August 12, 1949.

While I have illustrated my invention in but a single illustrative form of embodiment, which at present seems to be preferable, I wish it to be understood that my invention is susceptible of various changes by way of structural modifications, additions, omissions, and the substitution of equivalents, without departing from the essential spirit thereof. I desire, therefore, that the appended claims shall be accorded the broadest construction consistent with their language.

I claim as my invention:

1. An alternating-current dynamo-electric machine having a voltage-rating of at least 10,000 volts and comprising a stationary primary member, means for providing a gas-tight chamber including said stationary primary member, said stationary primary member comprising a frame-member, an annular stator-core supported within said frame-member, said stator-core having axially extending conductor-receiving slots therein, a primary winding having flat-sided winding-portions disposed within said conductor-receiving slots, a plurality of axially extending solid insulating members also disposed within each of said conductor-receiving slots of the stator-core, said insulating members being so disposed as to provide insulation-bounded axially extending cooling-ducts lying against the respective winding-portions in said slots, in such manner that the thermal path for the removal of the conductor-losses is substantially directly from the conductor to the coolant in said cooling-ducts, the insulating members in each slot including portions of said insulating members which overlie each other to provide insulating creepage-distance between the associated winding-portion and the stator-core, a gaseous filling, in said chamber, at a pressure of at least 50 pounds per square inch over the surrounding atmosphere, means for providing a recirculating path for said gaseous filling flowing axially within said cooling-ducts, and heat-exchanging means included in said recirculating path for cooling said gaseous filling.

2. The invention as defined in claim 1, characterized by said gaseous filling being hydrogen.

3. The invention as defined in claim 1, characterized by said gaseous filling being sulphur hexafluoride.

4. The invention as defined in claim 1, characterized by said gaseous filling being a gas containing a mist composed of a chemically inert liquid compound which vaporizes at the operating-temperatures prevailing within said cooling-ducts.

5. The invention as defined in claim 1, characterized by said gaseous filling being a gas containing a mist composed of a chemically inert liquid compound of fluorine and carbon, which vaporizes at the operating-temperatures prevailing within said cooling-ducts.

6. A dynamo-electric machine having stator and rotor members, at least one of said members comprising an annular core having axially extending conductor-receiving slots therein, and a winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts.

7. A dynamo-electric machine having stator and rotor members, and an enclosing housing, at least one of said members comprising an annular core having axially extending conductor-receiving slots therein, a winding having flat-sided winding-portions disposed within said conductor-receiving slots, top and bottom preformed axially extending solid insulating-channels and flat axially extending insulating barrier also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, said enclosing housing providing a fluid-tight chamber within which said core and said winding are located, a filling of an electrically insulating fluid having a dielectric breakdown-strength of at least 200 volts per mil in said chamber, means for providing a recirculating path for said fluid flowing axially within said cooling-ducts, and heat-exchanging means included in said recirculating path for cooling said fluid.

8. A dynamo-electric machine having stator and rotor members, and an enclosing housing, at least one of said members comprising an annular core having axially extending conductor-receiving slots therein, a winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, said enclosing housing providing a gas-tight chamber within which said core and said winding are located, a gaseous filling, in said chamber, at a pressure of at least 50 pounds per square inch over the surrounding atmosphere, means for providing a recirculating path for said gaseous filling flowing axially within said cooling-ducts, and heat-exchanging means included in said recirculating path for cooling said gaseous filling.

9. The invention as defined in claim 8, characterized by said gaseous filling being hydrogen.

10. The invention as defined in claim 8, characterized by said gaseous filling being sulphur hexafluoride.

11. The invention as defined in claim 8, characterized by said gaseous filling being a gas containing a mist composed of a chemically inert liquid compound which vaporizes at the operating-temperatures prevailing within said cooling-ducts.

12. The invention as defined in claim 8, characterized by said gaseous filling being a gas containing a mist composed of a chemically inert liquid compound of fluorine and carbon, which vaporizes at the operating-temperatures prevailing within said cooling-ducts.

13. A dynamo-electric machine having stator and rotor members, and an enclosing housing, at least one of said members comprising an annular core having axially extending conductor-receiving slots therein, a winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, said enclosing housing providing a liquid-tight chamber within which said core and said winding are located, a filling consisting of an electrically insulating liquid substantially filling said chamber, means for providing a recirculating path for said liquid flowing axially within said cooling-ducts, and heat-exchanging means included in said recirculating path for cooling said liquid.

14. An alternating-current dynamo-electric machine having a voltage-rating of at least 10,000 volts and comprising a stationary primary member, said stationary primary member comprising a frame-member, an annular stator-core supported within said frame-member, said stator-core having axially extending conductor-receiving slots therein, a primary winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, a stiff cylindrical insulating member extending through the airgap-bore of said stator-core and extending axially beyond said stator-core at each end, means for making a fluid-tight connection between each end of said cylindrical insulating member and the frame-member, thereby providing a fluid-tight chamber surrounding said cylindrical insulating member, a filling of an electrically insulating fluid having a dielectric breakdown-strength of at least 200 volts per mil in said chamber, means for providing a recirculating path for said fluid flowing axially within said cooling-ducts, and heat-exchanging means included in said recirculating path for cooling said fluid.

15. An alternating-current dynamo-electric machine having a voltage-rating of at least 10,000 volts and comprising a stationary primary member, said stationary primary member comprising a frame-member, an annular stator-core supported within said frame-member, said stator-core having axially extending conductor-receiving slots therein, a primary winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, a stiff cylindrical insulating member extending through the airgap-bore of said stator-core and extending axially beyond said stator-core at each end, means for making a gas-tight connection between each end of said cylindrical insulating member and the frame-member, thereby providing a gas-tight chamber surrounding said cylindrical insulating member, a gaseous filling, in said chamber, at a pressure of at least 50 pounds per square inch over the surrounding atmosphere, means for providing a recirculating path for said gaseous filling flowing axially within said cooling-ducts, and heat-exchanging means included in said recirculating path for cooling said gaseous filling.

16. The invention as defined in claim 15, characterized by said gaseous filling being hydrogen.

17. The invention as defined in claim 15, characterized by said gaseous filling being sulphur hexafluoride.

18. The invention as defined in claim 15, characterized by said gaseous filling being a gas containing a mist composed of a chemically inert liquid compound which vaporizes at the operating-temperatures prevailing within said cooling-ducts.

19. The invention as defined in claim 15, characterized by said gaseous filling being a gas containing a mist composed of a chemically inert liquid compound of fluorine and carbon, which vaporizes at the operating-temperatures prevailing within said cooling-ducts.

20. An alternating-current dynamo-electric machine having a voltage-rating of at least 10,000 volts and comprising a stationary primary member, said stationary primary member comprising a frame-member, an annular stator-core supported within said frame-member, said stator-core having axially extending conductor-receiving slots therein, a primary winding having flat-sided winding-portions disposed within said conductor-receiving slots, top and bottom preformed axially extending solid insulating-channels and flat axially extending insulating barriers also disposed within the respective conductor-receiving slots, the top and bottom insulating-channels fitting respectively over and under respective winding-portions lying within the several slots and covering only the top and bottom parts of said winding-portions, leaving an intermediate side-surface uncovered on each side of each of said winding-portions, the flat insulating barriers lying against the respective sides of the respective slots in overlapping relation to the sides of said insulating channels, to provide an insulation-bounded axially extending cooling-duct lying against each side of each of said winding-portions, in such manner that the thermal path for the removal of the conductor-losses is substantially directly from the conductor to the coolant in said cooling-ducts, a stiff cylindrical insulating member extending through the airgap-bore of said stator-core and extending axially beyond said stator-core at each end, means for making a liquid-tight connection between each end of said cylindrical insulating member and the frame-member, thereby providing a liquid-tight chamber surrounding said cylindrical insulating member, a filling consisting of an electrically insulating liquid substantially filling said chamber, means for providing a recirculating path for said liquid flowing axially within said cooling-ducts, and heat-exchanging means included in said recirculating path for cooling said liquid.

GRAHAM L. MOSES.

REFERENCES CITED

The following references are of record in the file of this patent:

UNITED STATES PATENTS

| Number | Name | Date |
|---|---|---|
| 1,269,909 | Cooper | June 18, 1918 |
| 2,285,960 | Fechheimer | June 9, 1942 |

FOREIGN PATENTS

| Number | Country | Date |
|---|---|---|
| 289,215 | Germany | Dec. 9, 1915 |